Figure 1:
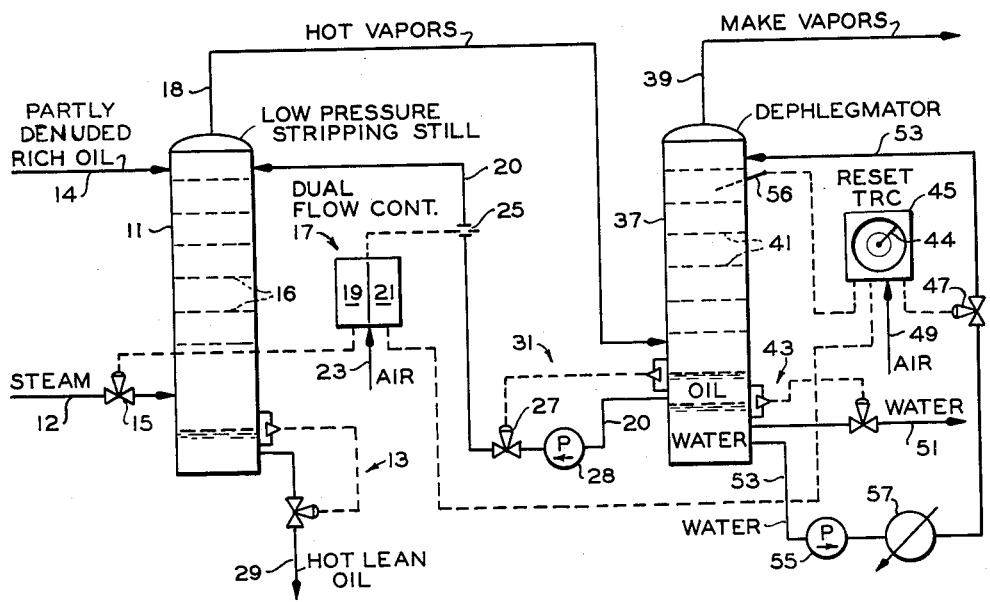

INVENTOR.
E. S. PALMER, JR.

ATTORNEYS.

3,096,274
Patented July 2, 1963

3,096,274
CONTROL OF STRIPPING STILL AND DEPHLEGMATOR OPERATION
Everett S. Palmer, Jr., Borger, Tex., assignor to Phillips Petroleum Company, a corporation of Delaware
Continuation of application Ser. No. 692,646, Oct. 28, 1957. This application Apr. 21, 1960, Ser. No. 24,868
3 Claims. (Cl. 208—341)

This invention relates to recovery of gasoline boiling range hydrocarbons from natural gas by the oil absorption process. In one aspect it relates to apparatus for and a method of operating a rich absorption oil stripping still and dephlegmator system. In another aspect, it relates to apparatus and a method for smoothing out operating irregularities in a rich absorption oil stripping still and dephlegmator system. In still another aspect, it relates to apparatus and a method for smoothing out operational irregularities caused by addition of make-up absorption oil containing light ends of boiling range within the boiling range of the desired product gasoline recovered from this rich oil distillation and dephlegmator system.

This application is a continuation of my copending application Serial No. 692,646, filed October 28, 1957, now abandoned.

By the term "absorption oil," as used throughout this specification and claims, is meant a conventional mineral seal oil, such as a straight run or paraffinic hydrocarbon oil having a molecular weight of about 200, and having an approximate distillation range of a kerosene or of a distillate. Other oils of higher or lower molecular weight are used in some instances. However, when using other oils operating conditions may need to be varied according to the nature of the particular oil used as will be understood by those skilled in the art. Some mineral seal oils, kerosene or distillates, contain light ends which distill over at temperatures below about 350° F., a desirable initial boiling point of a satisfactory absorption oil for some operations. This material boiling below 350° F. can be disposed of by including it with the recovered gasoline when such material boils within the desired boiling range of the gasoline product. With a normal volume of absorption oil circulation of about 1,200,000 gallons per day (about 830 gallons per minute) the volume of dephlegmator oil is about 100 gallons per minute. This oil is made up of the heavy ends of the gasoline boiling range hydrocarbons, the light ends of newly added absorption oil which has the boiling range of the heavy ends of the gasoline and recovered absorption oil boiling higher than the heavy gasoline ends. This absorption oil enters the dephlegmator with the stripping still overhead vapors partly as vapor and partly as mist. After addition of make-up absorption oil containing such light ends of gasoline boiling range, the dephlegmator oil volume increases considerably thereby causing the cyclic flow of an undesirably large volume of oil. When this undesirably large volume of dephlegmator oil is returned to the still, it overloads the still and its vapors pass to the dephlegmator only to be condensed and again returned to the still as dephlegmator oil. To remove the excess dephlegmator oil over the 100 gallons per minute, the volume considered normal in the operation of a plant cycling 1,200,000 gallons absorption oil per day, I automatically raise the dephlegmator top temperature about 10° to 20° F. by reducing the flow of cooling water to the top of the dephlegmator. Furthermore, I slow the removal rate of this low boiling oil fraction from the stripping still by reducing the rate of stripping steam added to the still.

An object of this invention is to provide apparatus and a method for operation of a rich absorption oil stripping still and dephlegmator system.

Another object of this invention is to provide apparatus and a method for automatically removing low boiling ends of the absorption oil from the stripping still and dephlegmator of an absorption-distillation system so as not to unduly interrupt normal operation of the system.

Still another object of this invention is to provide apparatus and a method for removing low boiling ends of added make-up absorption oil from the still and dephlegmator of an absorption-distillation system.

Still another object of this invention is to provide such a system and method which is automatic and smooth in its operation.

Still other objects and advantages of this invention will be realized upon reading the following description, which taken with the attached drawing, forms a part of this specification.

In the drawing, FIGURE 1 illustrates diagrammatically one arrangement of apparatus parts for carrying out the process of my invention.

Figure 2:
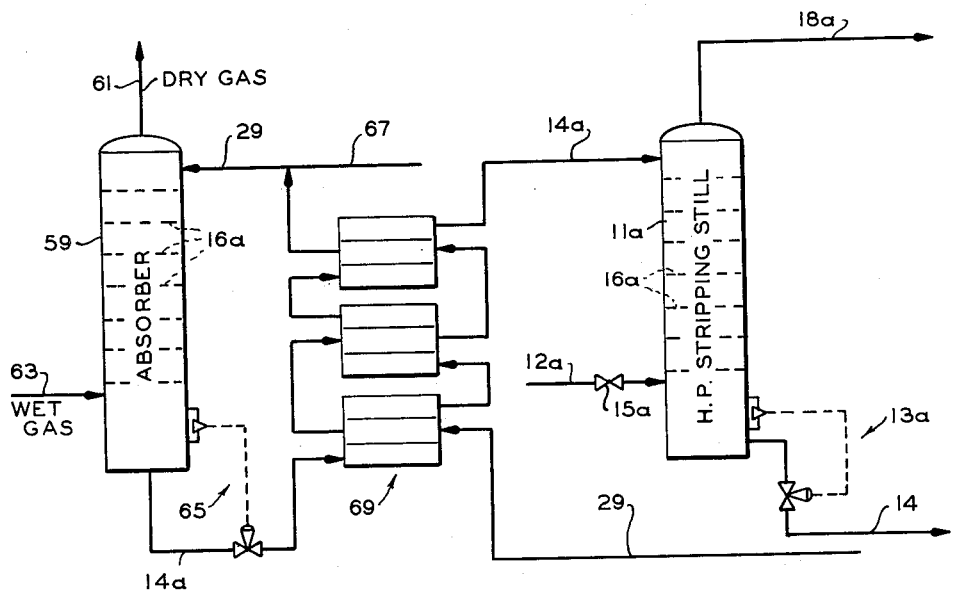

FIGURE 2 illustrates the relationship of the apparatus of FIGURE 1, with an absorber, and a high pressure still.

Specifically, my invention includes in a low pressure still and dephlegmator system, the improvement comprising, in combination, a still for distilling a feed comprising an absorption oil enriched with absorbed hydrocarbons, a dephlegmator for condensing at least a portion of the vaporous overhead distillate from said still, a first conduit for admission of stripping steam to said still, a second conduit for passage of overhead vapors from said still to said dephlegmator, a third conduit for passage of dephlegmator oil from the lower portion of said dephlegmator to the upper portion of said still, a fourth conduit for passage of cooling water from the lower portion to the upper portion of said dephlegmator, a flow sensing first means in said third conduit, second means for regulating the flow of steam in said first conduit in inverse proportion to the rate of flow of dephlegmator oil in said third conduit, and third means for regulating the flow of water in said fourth conduit in inverse proportion to the rate of flow of dephlegmator oil in said third conduit.

Furthermore, my invention involves a method for operating a rich absorption oil distillation and dephlegmator system, comprising, introducing an absorption oil rich in gasoline boiling range hydrocarbons into a distillation zone, introducing stripping steam to said zone and therein stripping said hydrocarbons from the absorption oil thereby producing overhead vapors from said distillation zone, introducing said overhead vapors into a dephlegmation zone, introducing cooling water into the upper portion of said dephlegmation zone and in said dephlegmation zone cooling said vapors by direct heat exchange with said cooling water whereby at least a portion of the high boiling ends of said vapors condense to produce a dephlegmator oil, withdrawing heat exchanged water from said dephlegmation zone, cooling the withdrawn water to produce the first mentioned cooling water, withdrawing said dephlegmator oil from said dephlegmation zone and introducing this withdrawn oil into the upper portion of said distillation zone as reflux, and decreasing the rate of introduction of steam into said distillation zone and decreasing the rate of introduction of said cooling water into said dephlegmation zone in response to an increase in the rate of withdrawal of said dephlegmator oil from said dephlegmation zone, and alternately increasing the rate of introduction of steam into said distillation zone, and increasing the rate of introduction of said cooling water into said dephlegmation zone in response to a decrease in the rate of withdrawal of said dephlegmator oil from said dephlegmation zone.

Referring now to the drawing and specifically to FIGURE 2, reference 59 identifies a more or less conventional absorber in which, for example, a mineral seal oil or other absorption oil is introduced by way of a pipe 29. This mineral seal oil flows downward in countercurrent contact with a gas introduced by way of a pipe 63 for absorption of absorbable hydrocarbons from the gas. Gases not absorbed by the absorption oil leave the system by way of a pipe 61. Absorption oil enriched in absorbed hydrocarbons leaves absorber 59 by way of a pipe 14a. The flow of rich absorption oil in this pipe is regulated by a liquid level control apparatus 65. The rich absorption oil flowing through pipe 14a is heat exchanged by passing through exchangers 69 with hot lean absorption oil from still 11. The heated oil from exchangers 69 is introduced into the top of a high pressure stripper still 11a and flows downward therein in countercurrent contact with upflowing steam introduced through a pipe 12a. The rate of introduction of steam into stripper 11a is regulated by a valve 15a. Make-up absorption oil as required is introduced into the system by way of pipe 67. Absorber 59 is provided with any suitable type of vapor-liquid contacting apparatus 16a. Liquid level control apparatus 13a regulates the rate of withdrawal of the hot, partly denuded absorption oil from still 11a.

In reference to FIGURE 1, the low pressure stripping still 11 is provided with vapor-liquid contacting apparatus 16 which is suitable for the purpose at hand and which may be selected from among the various types of such contacting equipment commercially available.

Partly denuded rich oil from still 11a is introduced into the low pressure stripper still 11 by way of pipe 14. This absorption oil, that is, absorption oil which contains absorbed hydrocarbons, flows downward in counter-current relation to upflowing steam introduced by way of pipe 12. Since steam heats the rich absorption oil, as well as reduces the partial pressure of the absorbed hydrocarbons the steam and removed vaporous hydrocarbons leave still 11 by way of an overhead vapor line 18. This vaporous material is introduced into the lower portion of a dephlegmator 37. This dephlegmator is merely a partial condenser in which cooling water from a pipe 53 is contacted directly with the overhead vaporous materials from still 11. The dephlegmator not only cools the overhead materials but also condenses the highest boiling ends. The condensed hydrocarbon material which settles to the bottom of dephlegmator is termed herein "dephlegmator oil." Since live steam is introduced into still 11 from pipe 12 the overhead vapors from the still contain an appreciable proportion of steam and a considerable amount of this steam is also condensed in the dephlegmator so that a layer of water is present in the dephlegmator below the dephlegmator oil. A portion of the water from the dephlegmator is removed by way of pipe 53 by a pump 55 and is recycled to the top of the dephlegmator, after being cooled in a cooler 57, in the cyclic operation. A motor valve 47, disposed in pipe 53, regulates the rate of recycling of this cooling water. The rate at which the cooling water is introduced into the dephlegmator and its temperature, control the temperature in top of the dephlegmator and the degree of condensation taking place therein. Cooled but uncondensed vapors from dephlegmator are removed through a pipe 39 for such further treatment and disposal as desired. The water not required for recycling to the dephlegmator is removed therefrom through a pipe 51 controlled by a liquid level controller apparatus 43. In a similar manner the dephlegmator oil which floats on top of the water is removed through a pipe 20 by pump 28 for introduction into still 11. The rate of the withdrawal of the dephlegmator oil is controlled by a motor valve 27 of the throttle type, which is actuated by a liquid level control apparatus 31. A liquid level control apparatus 13 is provided at the kettle of still 11 for removal of the hot lean oil.

The control portion of my invention involves use of a flow controller 17 which comprises two portions, that is, two separate flow controllers identified by reference numerals 19 and 21. Two separate flow controllers can be used or the two flow controllers can be built or constructed into a single piece of equipment, as described. Flow controller 19 communicates with motor valve 15 while the flow controller 21 communicates with a reset temperature recorder controller 45. This reset temperature recorder controller 45 has a reset pointer 44 which in some instances is set manually but according to my invention is set automatically by actuation of the controller 21. The flow controller 21 resets the pointer 44 to a desired temperature to be maintained in the top portion of dephlegmator 37. Upon resetting or upon setting pointer 44 to a given temperature this reset temperature recorder controller then regulates the flow of water in pipe 53 by actuating motor valve 47 in response to temperature sensed by a temperature sensing element 56, such as a thermocouple. For example, if it is desired to hold the top temperature of dephlegmator 37 at, for example 200° F., upon setting of the needle 44 at 200° F. the reset temperature recorder controller opens and throttles motor valve 47 in response to temperature sensed by temperature sensing device 56 as regards temperatures slightly above or slightly below the desired set temperature. Instrument air or air for actuating the reset temperature recorder controller and the motor valve 47 enters controller 45 by way of a pipe 49 from a source, not shown.

Dephlegmator 37 is provided with vapor-liquid contacting apparatus 41 of any suitable type. Air pressure for actuating the flow controller 17 and motor valve 15 and for providing pressure air in the conduit communicating flow controller 21 with the reset controller 45 is provided from a source, not shown, by way of a pipe 23.

In the operation of the process as herein described it is ordinarily intended in such dephlegmator systems that the cooling water in the dephlegmator condense as liquid only the actual absorption oil vapors carried over with the steam and stripped hydrocarbon vapors. However, the dephlegmator is operated in such a manner as to regulate the end boiling point of the hydrocarbon vapors taken overhead therefrom. If gasoline specifications call for an end boiling point of 350° F., for example, it is a simple matter to regulate the cooling water to the dephlegmator to produce dephlegmator overhead vapors, when condensed, having an end boiling point of around 350° F.

After use of a given batch of absorption oil it is necessary to add make-up oil occasionally to replace that inadvertently lost. As mentioned hereinbefore such oils as the kerosene or distillate boiling range type of oil is satisfactory for this use. In many instances such oils contain at least a small portion of hydrocarbons boiling below about 350° F. When such an oil is used as the absorption oil in this operation and 350° F. is the desired end point of make hydrocarbon vapors removed by way of pipe 39 then the hydrocarbons of the newly added make-up absorption oil which boil below 350° F. tend to leave the dephlegmator with the gasoline vapors. When a batch of make-up absorption oil is added these low boiling point absorption oil hydrocarbons overload the still and dephlegmator. Hydrocarbons condensed in the dephlegmator are recycled to the still 11 by way of pipe 20 as controlled by liquid level controller 31 and motor valve 27. Upon readdition of this oil to the still the low boiling material is redistilled and leaves still 11 through pipe 18 and is returned to the dephlegmator. In the dephlegmator these hydrocarbon vapors are again condensed and the condensate returned to the still with the result that this oil merely recycles from still to dephlegmator to still, etc. Such cyclic flow of materials of course does not represent good plant operation. It is desired, therefore, that when the absorption oil contains such materials they be removed from the system without undue upsetting of the operation of the system.

I make provision for removing such hydrocarbons from the system by reducing the flow of stripping steam through pipe 12 into the still 11 so that all of the returned dephlegmator oil will not be distilled. In other words the steam to the still is reduced to permit at least a portion of the dephlegmator oil hydrocarbons to remain in the absorption oil for removal through pipe 29 with the lean oil. Also my apparatus makes provision for increasing the temperature in the top of the dephlegmator 37 by throttling valve 47 and thereby reducing the rate of water introduction into the top of the dephlegmator in order to allow at least a portion of the lowest boiling dephlegmator oil hydrocarbons to pass overhead with the make vapors in pipe 39. Obviously only dephlegmator oil vapors which have an end boiling point of the desired make gasoline is permitted to pass overhead through pipe 39 with the gasoline vapors.

By raising the dephlegmator top temperature a few degrees and by reducing the steam to the stripping still by a small amount I am able to remove the excessive amount of hydrocarbons boiling below 350° F. slowly from the system without upsetting its overall operation. The flow sensing apparatus 25 is an orifice plate. Pressure take-off tubes communicate pipe 20 before and after the orifice plate with the dual controller 17 (controller 19) and the steam to the still 11 is controlled in response to the rate of flow of the dephlegmator oil in pipe 20. The greater the flow of dephlegmator oil in pipe 20 and accordingly through orifice plate 25, the more the steam flowing through pipe 12 is reduced. In other words the greater the amount of the recycling hydrocarbons boiling below 350° F. the more the steam is reduced to the still to permit a larger proportion of these recycling hydrocarbons to pass from the still with the lean oil. In this manner, at least a portion of this dephlegmator oil is temporarily removed from the dephlegmator portion of the system. This dual flow controller 17 (controller 21) also resets the reset temperature recorder controller 45 in response to the rate of flow of dephlegmator oil through pipe 20. Again it is obvious that the greater the flow of dephlegmator oil in pipe 20 the more of this recycle oil there is in this portion of the system for removal and accordingly the greater the flow of oil in pipe 20 the higher the temperature is set in the reset controller to be maintained in the top of the dephlegmator.

As a portion of the dephlegmator oil is removed from the system through pipe 39 and as another portion of the dephlegmator oil is removed with the hot lean oil in pipe 29 the amount of dephlegmator oil recycled to pipe 20 is reduced. Then, by a decrease in the flow of dephlegmator oil in pipe 20, the flow controller 19 actuates throttle valve 15 to increase somewhat the introduction of steam into still 11 and the flow controller 21 resets the reset temperature recorder controller 45 to reduce at least somewhat the top tower temperature of dephelgmator 37. This alteration of steam to the still and water to the top of the dephlegmator continues until the rate of flow of dephlegmator oil through flow sensing apparatus 25 is about normal for the system. Therefore the rate of flow of dephlegmator oil through pipe 20 will be normal for the system at such a time as all of the hydrocarbons or light ends boiling below about 350° F. are removed from the system after the addition of make-up absorption oil containing such hydrocarbons.

In one case a low pressure stripping still was operated at 50 p.s.i.g. (pounds per square inch gage); about 1,350,000 gallons rich oil at 380° F. was fed to the still. About 1,200,000 gallons lean oil per day were removed from the low pressure still and passed to the absorber via pipe 29 and exchangers 69. The dephlegmator had a bottom temperature of 270°–275° F., a top temperature of 165°–215° F., at a pressure of 47 p.s.i.g.; about 150,000 gallons gasoline of about 350° F. end boiling point were removed as overhead vapors from the dephlegmator. A mineral seal oil of about the kerosene boiling range was the absorption oil. Normally the dephlegmator oil flow was about 100 gallons per minute. Upon adding make-up absorption oil, the dephlegmator oil flow increased thereby actuating the reset controller to reset the dephlegmator top temperature to about 10° to 20° F. above its normal temperature. The steam to the still was reduced, and after one to two days of such operation the flow of dephlegmator oil returned to its normal flow of about 100 gallons per minute. The ratio controller reset the reset controller to lower the dephlegmator top temperature. The steam was increased to the still and the operation remained normal until the next batch of make-up absorption oil was added.

By practicing my invention, I find that the dephlegmator oil pump operates more smoothly and the make gasoline removed from the system through pipe 39 has a smaller range of end point. I also find that the low boiling ends of the absorption oil are removed to the extent that the dephlegmator oil pump does not vapor lock.

The still 11 as disclosed in this process is generally considered to be a low pressure stripping still such as is used in a 2-still stripping of gasoline boiling range hydrocarbons from the mineral seal absorption oil in conventional gasoline extraction plant operation. The pressure in such a still is ordinarily between about 45 and 60 p.s.i.g., for example, approximately 50 p.s.i.g. The pressure in the dephlegmator is usually 3 to 5 p.s.i.g. lower than the pressure in the low pressure still. The absorber is frequently operated at about 250 to 1000 p.s.i.g. and at as near atmospheric temperature as possible. The high pressure still is operated at 235 to 250 p.s.i.g. and a kettle temperature of about 380° to 400° F. The top of the low pressure still is about 375° to 395° F.

While certain embodiments of the invention have been described for illustrative purposes, the invention obviously is not limited thereto.

I claim:

1. A dephlegmator system comprising, in combination, a still for distilling a feed material, a dephlegmator for condensing at least a portion of the vaporous overhead distillate from said still, a first conduit for admission of stripping steam to said still, a second conduit for passage of overhead vapors from said still to said dephlegmator, a third conduit for passage of dephlegmator oil from a lower portion of said dephlegmator to an upper portion of said still, a flow sensing means in said third conduit, a first controller for regulating the flow of steam in said first conduit inversely to the rate of flow of dephlegmator oil in said third conduit as sensed by said flow sensing means, a fourth conduit for passage of cooling water from a lower portion to an upper portion of said dephlegmator, a reset temperature responsive flow controller, a second controller for resetting said reset controller for regulating the flow of cooling water in said fourth conduit inversely to the rate of flow of dephlegmator oil in said third conduit as sensed by said flow sensing means, a temperature sensing means disposed in the upper portion of said dephlegmator, said reset flow controller being adapted to maintain its resetting in response to temperature as sensed by said temperature sensing means.

2. A still and dephlegmator system comprising, in combination, a still for distilling a rich absorption oil, a dephlegmator for condensing at least a portion of the overhead distillate from said still, a first conduit for admission of stripping steam to the lower portion of said still, a second conduit for passage of overhead vapors from said still to said dephlegmator, a third conduit for passage of dephlegmator oil from a lower portion of said dephlegmator to the upper portion of said still, a flow sensing means in said third conduit, a first motor valve disposed operatively in said first conduit, a first flow controller in operative communication with said flow sensing means and with said first motor valve, said flow controller being adapted to throttle said first motor valve to restrict the flow of stripping steam in said first conduit inversely to the rate of flow of dephlegmator oil in said third conduit as sensed by said flow sensing means, a fourth conduit for passage of cooling water from a lower portion of said dephlegmator to the upper portion thereof, a cooler for cooling water flowing in said fourth conduit, a second motor valve in said fourth conduit, a temperature sensing means in the upper portion of said dephlegmator, a second flow controller, a reset temperature recorder controller, said second flow controller being adapted to raise the temperature setting of said reset controller in response to an increase in the rate of flow of dephlegmator oil in said third conduit as sensed by said flow sensing means, and said reset temperature controller being adapted to throttle said second motor valve to restrict the rate of flow of cooling water in said fourth conduit in further response to a decrease of temperature below a reset temperature setting of said reset controller as sensed by said temperature sensing means.

3. A method for operating a rich absorption oil distillation and dephlegmator system, comprising, introducing an absorption oil rich in gasoline boiling range hydrocarbons into a distillation zone, introducing stripping steam into said zone and therein distilling absorbed hydrocarbons and low boiling ends of said absorption oil from the remainder of the absorption oil thereby producing overhead vapors from said distillation zone, introducing said overhead vapors into a dephlegmation zone, introducing cooling water into the upper portion of said dephlegmation zone and in said dephlegmation zone cooling said vapors by direct heat exchange with said cooling water whereby at least a portion of the high boiling ends of said vapors condense to produce a dephlegmator oil, withdrawing heat exchanged water from the bottom of said dephlegmation zone, cooling the withdrawn water to produce the first mentioned cooling water, withdrawing said dephlegmator oil from said dephlegmation zone and introducing this withdrawn oil into the upper portion of said distillation zone, decreasing the rate of introduction of steam into said distillation zone in response to an increase in the rate of introduction of said dephlegmator oil into said distillation zone, and increasing the rate of introduction of steam into said distillation zone in response to a decrease in the rate of introduction of said dephlegmator oil into said distillation zone.

References Cited in the file of this patent

UNITED STATES PATENTS

| | | |
|---|---|---|
| 1,743,568 | Price | Jan. 14, 1930 |
| 1,940,802 | Kallam | Dec. 26, 1933 |
| 1,940,803 | Kallam | Dec. 26, 1933 |
| 2,252,550 | Bragg | Aug. 12, 1941 |
| 2,273,412 | McCullogh | Feb. 17, 1942 |
| 2,414,371 | Fragen et al. | Jan. 14, 1947 |
| 2,749,281 | Ferro | June 5, 1956 |
| 2,771,149 | Miller et al. | Nov. 20, 1956 |
| 2,974,100 | Mitchell | Mar. 7, 1961 |